United States Patent [19]

Raess et al.

[11] 4,024,757
[45] May 24, 1977

[54] GEAR TESTING MACHINE

[75] Inventors: Ulrich Raess, Regensdorf; Hans Jaeger, Volketswil; Max Anderes, Zurich, all of Switzerland

[73] Assignee: Werkzeugmaschinenfabrik Oerlikon-Buhrle AG, Zurich, Switzerland

[22] Filed: June 23, 1975

[21] Appl. No.: 589,607

[30] Foreign Application Priority Data

June 28, 1974 Switzerland ............... 8911/74

[52] U.S. Cl. ............... 73/162
[51] Int. Cl.² ............... G01M 13/02
[58] Field of Search ............... 73/162; 51/287

[56] References Cited

UNITED STATES PATENTS

| | | | |
|---|---|---|---|
| 1,958,550 | 5/1934 | Simmons | 73/162 |
| 3,069,813 | 12/1962 | Bauer et al. | 73/162 X |
| 3,611,800 | 10/1971 | Howlett et al. | 73/162 |
| 3,712,000 | 1/1973 | Spear | 73/162 |
| 3,795,143 | 3/1974 | Deprez et al. | 73/162 |
| 3,894,429 | 7/1975 | Konersmann et al. | 73/162 |

Primary Examiner—Richard C. Queisser
Assistant Examiner—Daniel M. Yasich
Attorney, Agent, or Firm—Werner W. Kleeman

[57] ABSTRACT

A testing machine for bevel gears and hyperboloidal gears comprising a machine bed upon which there are displaceably arranged two headstocks each having a work spindle, and a manually actuatable device for displacing at least one headstock. The testing machine can be used as a lapping machine by the addition of a first automatic device for displacing at least one headstock, by the addition of a second automatic device for displacing at least one work spindle in its axial direction and by disconnecting the manually actuatable headstock displacing device.

2 Claims, 11 Drawing Figures

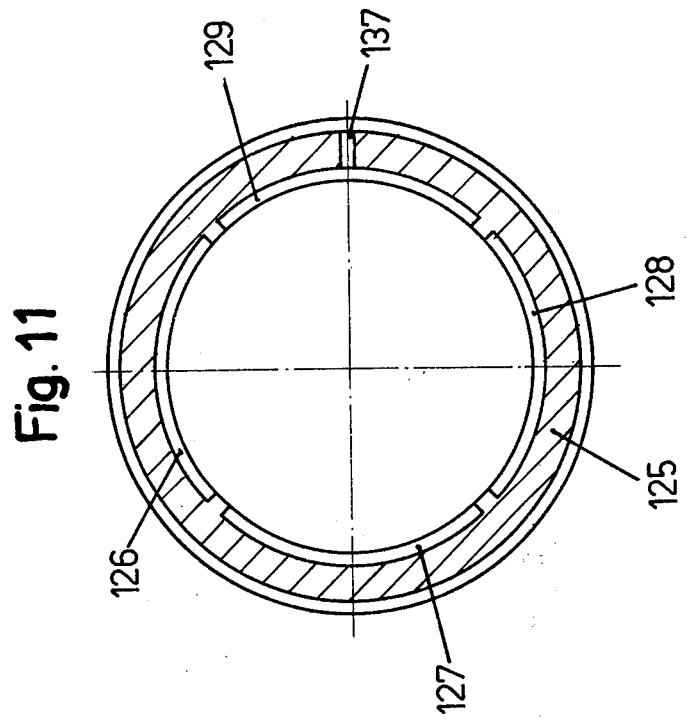
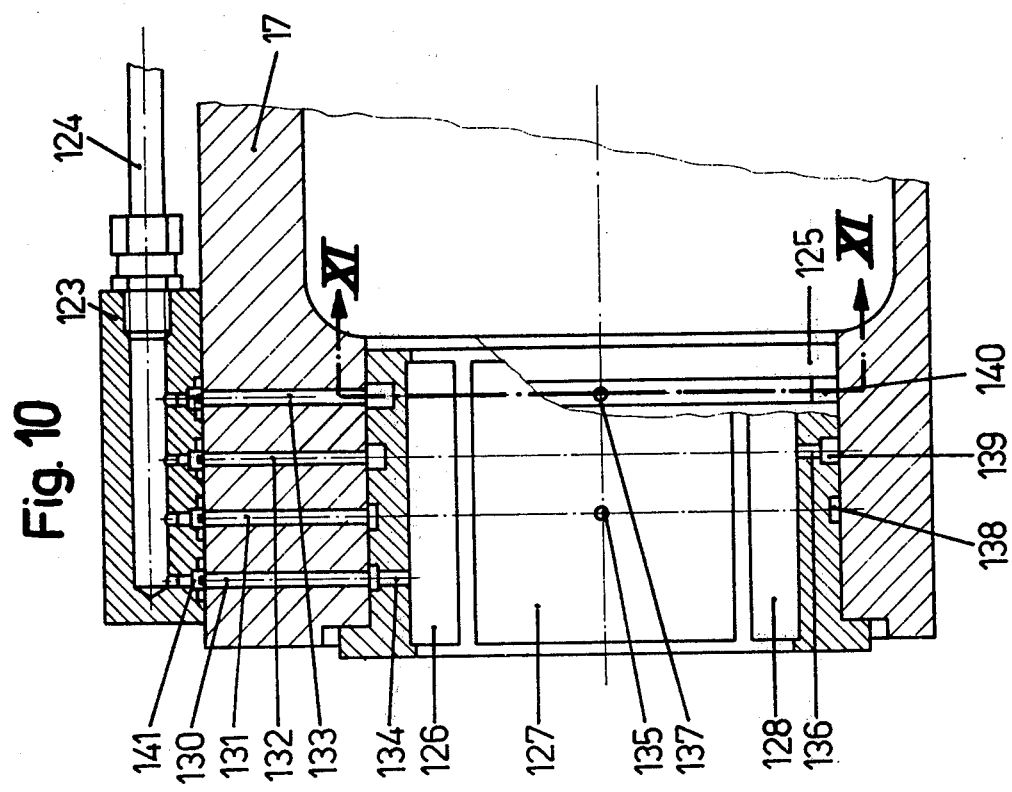

GEAR TESTING MACHINE

BACKGROUND OF THE INVENTION

The present invention relates to a new and improved construction of a gear testing machine for bevel gears and hyperboloidal gears of the type comprising a machine bed, two headstocks each having a work spindle and displaceably arranged at the machine bed, there further being provided a manually actuatable device for displacement of at least one of the headstocks.

Prior art testing machines of this type are associated with the drawback that they can only be used for testing gears and not for lapping, so that apart from the gear testing machine there is also required a lapping machine.

SUMMARY OF THE INVENTION

It is a primary object of the present invention to amplify the field of use of a gear testing machine and to thereby overcome the limitations prevailing in this regard in this particular field of technology.

Another and more specific object of the present invention aims at the provision of a new and improved construction of a gear testing machine which is no more complicated and therefore no more expensive than prior art gear testing machines and when necessary can be augmented by means of auxiliary devices into a gear lapping machine.

Now in order to implement these and still further objects of the invention, which will become more readily apparent as the description proceeds, the gear testing machine of this development is manifested by the features that it can be used as a lapping machine by the addition of a first automatic device for displacing at least one of the headstocks, by the addition of a second automatic device for displacing at least one of the work spindles in its axial direction, and by disconnecting or rendering ineffectual the manually actuatable headstock displacement device.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 10 is a cross-sectional view through a second exemplary embodiment of a hydrostatic bearing of a work spindle of the machine illustrated in FIG. 1; and FIG. 11 is a cross-sectional view taken along the line XI—XI of FIG. 9.

DETAILED DESCRIPTION OF THE INVENTION

Figure 1:
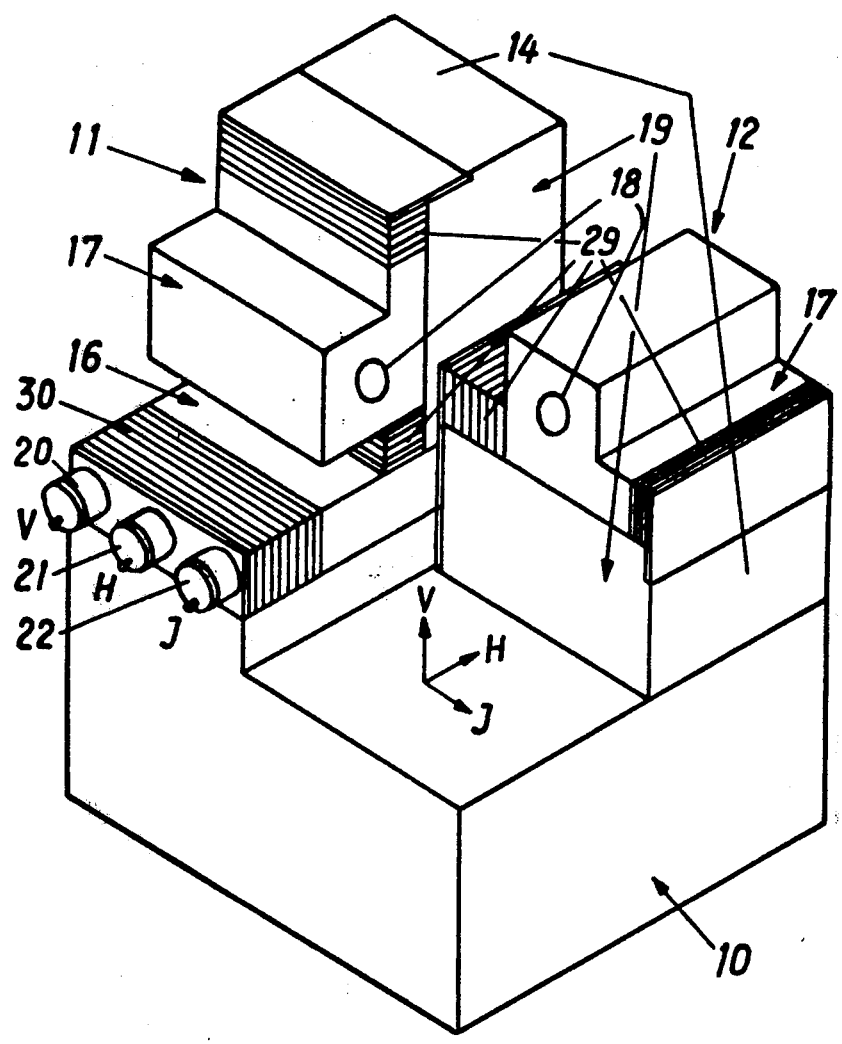
FIG. 1 is a front perspective view of a lapping-and testing machine.
Figure 2:
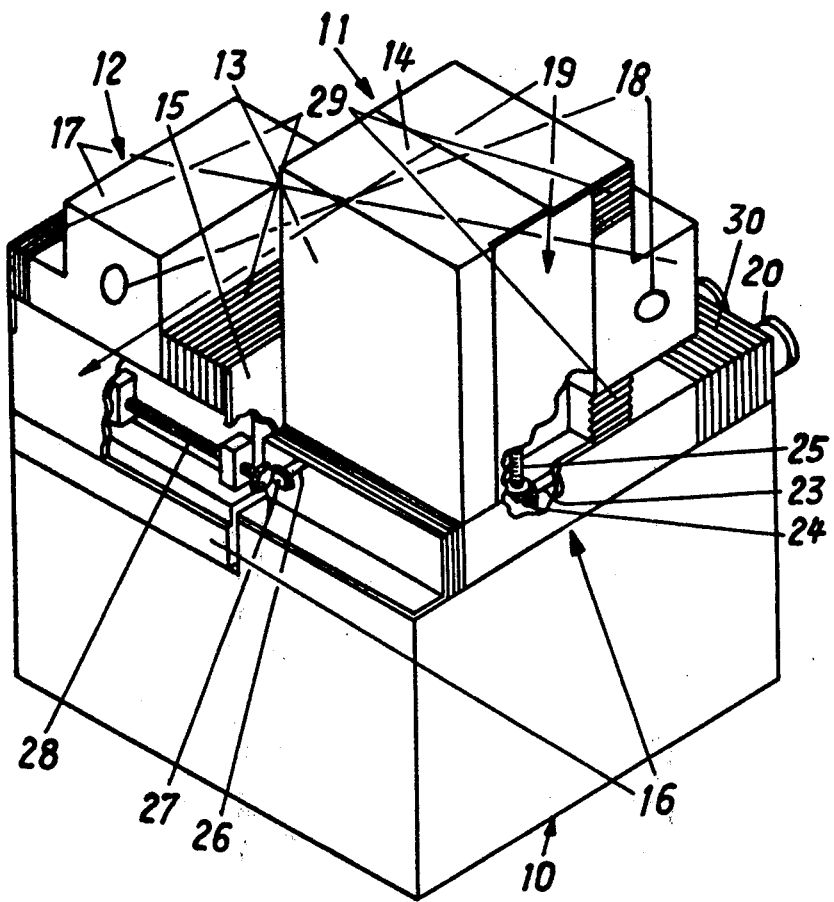
FIG. 2 is a perspective view of the same machine shown in FIG. 1 but viewed from the rear.

Describing now the drawings, according to the exemplary embodiment illustrated in FIGS. 1 and 2 the machine of this development comprises a machine bed 10 and two changeable or interchangeable components 11 and 12. Both components 11 and 12 possess a rear wall 13 and two end walls 14 and 15. The component 11 is secured by means of its end wall 14 to a carriage or slide 16 and the component 12 is rigidly secured at the machine bed 10 by means of its rear wall 13. Each component 11 and 12 possesses a headstock 17 having a spindle 18. Each headstock 17 is displaceably mounted upon a headstock bed or housing 19. According to the coordinates J, H and V illustrated in FIG. 1 the carriage 16 is displaceable in the H-direction (horizontal direction), and the headstock 17 of the component 11 is displaceable upon the housing 19 of the component 11 in the V-direction (vertical direction). The headstock 17 of the component 12 is displaceable in the J-direction upon the housing 19 of the component 12. At both of the spindles 18 of the components 11 and 12, there can be secured the gears which are to be lapped, and which have not here been illustrated to preserve clarity in the drawings and to simplify the illustration thereof. At the machine bed 10 there are arranged three manually operated or hand wheels 20 (V), 21 (H) and 22 (J). By means of the hand wheel 20 (V) it is possible to displace the headstock 17 of the component 11, and by means of the hand wheel 22 (J) it is possible to displace the headstock 17 of the component 12. With the hand wheel 21 (H) it is possible to displace the carriage or slide 16.

From the showing of FIG. 2 it will be apparent that by means of the hand wheel 20 (V) the drive is transmitted via the shaft 23, bevel gears 24 to a vertical feed spindle 25 by means of which it is possible to raise and lower the headstock 17 of the component 11. From FIG. 2 it will be further apparent that from the hand wheel 22 (J) (FIG. 3) there is transmitted the drive via the shaft 26, bevel gears 27 to a horizontal feed spindle 28 by means of which the headstock 17 of the component 12 can be displaced horizontally.

The spindle 28 carries the nut or nut member 144 (FIG. 4) and the pre-biased nut or nut member 143. By means of the prebiasing action there is achieved a condition absolutely free of play.

In order that the guide rails upon which the headstocks 17 are displaced do not become contaminated or soiled, bellows 29 or equivalent structure are arranged to both sides of each headstock 17. Also a bellows 30 or equivalent structure is arranged between the hand wheels 20, 21 and 22 and the carriage 16. These guide rails have been illustrated in greater detail in FIG. 3. The carriage 16 is displaceable upon two guide rails 31 and 32 secured to the machine bed 10. The headstock 17 of the component 11 is displaceable upon the vertically guide rails 33 and 34 and the headstock 17 of the component 12 is displaceable upon the guide rails 35 and 36.

Figure 3:
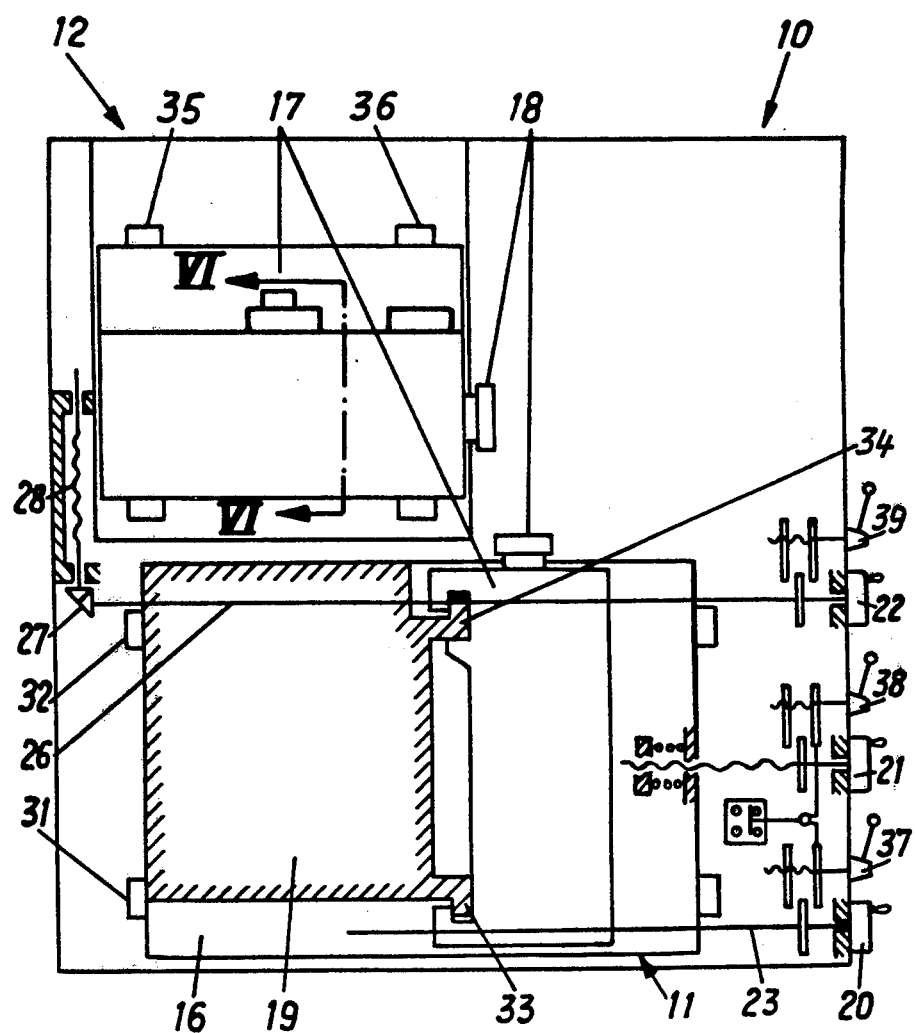
FIG. 3 is a top plan view of the machine illustrated in FIGS. 1 and 2.

Adjacent each hand wheel 20, 21 and 22 there is arranged a respective clamping device 37, 38 and 39 in FIG. 3 by means of which the hand wheels 20 to 22 are secured against an unintentional rotation.

Figure 4:
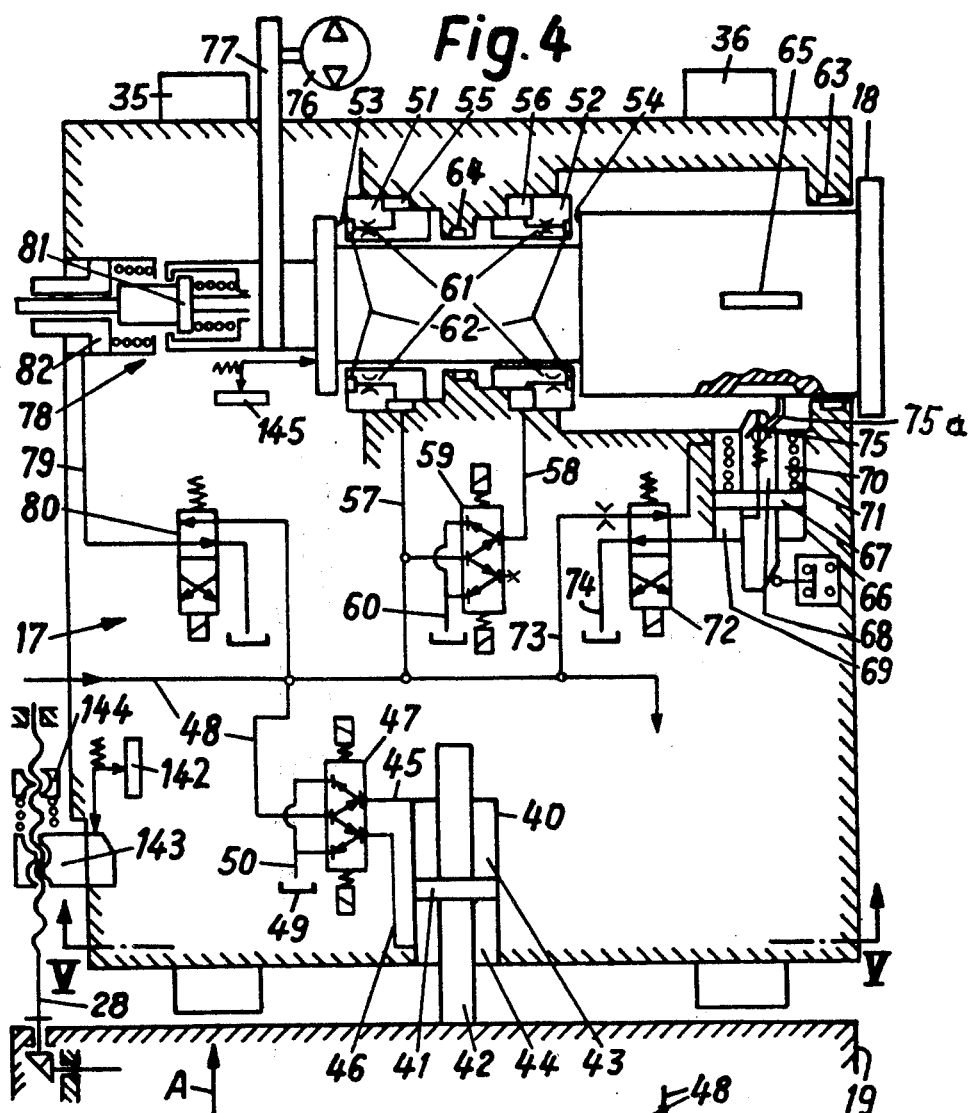
FIG. 4 is a schematic view of a headstock of the machine illustrated in FIGS. 1 to 3.
Figure 5:
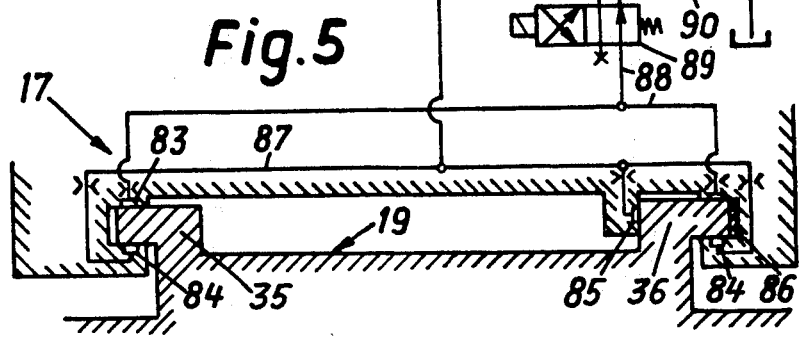
FIG. 5 is a schematic view, partially in cross-section, taken along the line V—V of FIG. 4.

In FIGS. 4 and 5 there is illustrated the kinematic construction of only one of both components 11 and 12, since both such components 11 and 12 are of identical construction and are, therefore, interchangeable.

Apart from the already disclosed feed spindle 28 by means of which the headstock 17 can be manually displaced upon both of the guide rails 35 and 36 there is further provided a cylinder 40 in FIG. 4 in which there is displacebly arranged a piston 41. This piston 41 is secured through the agency of a piston rod 42 at the housing 19 and sub-divides the cylinder 40 into two compartments or chambers 43 and 44. Both of the chambers 43 and 44 are connected via the conduits or lines 45 and 46, respectively, with an electrically actuatable control slide or slide valve 47. Depending upon the position of the control slide or slide valve 47 either the chamber 44 is connected via the conduit 46 with the pressure line or conduit 48 connected with an oil pump, whereby at the same time the chamber 43 is connected via the line 45 with the discharge conduit or line 50 opening into a vat or trough 49, or the chamber 43 is connected via the line 45 with the pressure line or conduit 48 connected with the oil pump, whereby at the same time the chamber 44 is connected via the conduit or line 46 with the discharge or drain line 50 opening into the vat or trough 49. The control slide or slide valve 47 is controlled by means of an electrical signal according to the well known principle of the electrical position regulation in a closed regulation or regulating circuit. The element which determines the electrical actual value is constituted by a displacement path transmitter 142.

Now it is possible to realize a mechanical displacement by simply coupling the spindle nut member 144 with the headstock 17. On the other hand there can be realized an electrical displacement (follow-up regulation or servo regulation) by carrying out a coupling with the actual value transmitter or displacement path transmitter 142.

The spindle 18 is mounted to be axially displaceable in the headstock 17. In order to displace the spindle 18 there are provided in FIG. 4 two substantially ring-shaped pistons 51 and 52 which surround the spindle 18 and bear against two shoulders 53 and 54 of the spindle 18. These pistons 51 and 52 are displaceably mounted in the headstock 17, and there is thus formed a smaller compartment or chamber 55 and a larger compartment or chamber 56. The chamber 56 can be selectively connected with a discharge line or conduit 60 or by means of an electrical control valve with the conduit or line 57. The line 57 is operatively connected with the previously mentioned pressure line or conduit 48, so that the conduit or line pressure prevails in the smaller chamber 55. In the event that both chambers 55 and 56 are connected with the pressure line 48 then the spindle 18 is displaced into its forwardmost position, since both of the chambers 55 and 56 are of different size. During installation of the control valve, depending upon the position of the control valve 59, the larger chamber 56 is either likewise connected with the pressure line 48, or the chamber 56 is connected with the discharge line 60. The control valve or slide valve 59 is controlled by means of an electrical signal in accordance with the principle of electrical postion regulation. The actual value is determined by the displacement path transmitter 145. Both of the chambers or compartments 55 and 56 are connected through the agency of throttles 61 with hydrostatic axial bearings 62. Furthermore, the spindle 18 is mounted in two hydrostatic radial bearings 63 and 64.

In order to fix the spindle 18 in a predetermined angular position axially directed grooves 65 are provided in the spindle 18. A piston member 67 (FIG. 4) is displaceably arranged in a cylinder 66 of the headstock 17, this piston 67 possessing a piston rod 68 which cooperates with the groove 65 of the spindle 18. The piston 67 sub-divides the cylinder 66 into two compartments or chambers 69 and 70. In the chamber 70 there is located a spring 71 which strives to bring the piston rod 68 out of engagement from the groove 65 of the spindle 17. Both of the chambers 69 and 70 are connected via conduits or lines with a control slide or slide valve 72. Depending upon the position of such slide valve --also known in the art as servo slide valves-- either the chamber 70 is connected by means of the conduit or line 73 with the pressure line 48 and the chamber 69 is connected with the discharge line 74, or the chamber 69 is connected via the conduit 73 with the pressure line 48 and the chamber 70 is connected with the discharge line 74. In the piston rod 68 there is located a valve 75 possessing a feeler 75a which either bears upon the spindle 18 or protrudes into the groove 65. As soon as it protrudes into the groove 65 the valve 75 closes. This valve 75 is connected with the chamber or compartment 69 and prevents that there will prevail in the chamber 69 the full or complete pressure before the piston rod 68 protrudes into the groove 65.

For the drive of the spindle 18 there is provided a hydraulic motor 76 (FIG. 4) which can work both as a drive motor as well as also as a braking motor, i.e., as a pump. This motor 76 is connected via a gear drive or gearing arrangement 77 or equivalent structure with the spindle 18. Furthermore, at the spindle 18 there is arranged a conventional clamping or chuck device 78 for clamping a gear at the front end of the spindle 18. This clamping or chuck device 78 is connected via a line or conduit 79 with a control slide valve or servo slide valve 80 which likewise is connected with the pressure line or conduit 48. This clamping or chuck device 78 possesses a first spring-loaded piston 81 and a second spring-loaded piston 82. The second piston 82 can be impinged with pressurised oil by way of example. The spring force acting upon the first piston or piston member 81 strives to fixedly clamp the gear. The second piston or piston member 82 bears against the first piston 81 and is capable of displacing the first piston 81 against the force of the spring in order to release the gear.

According to the showing of FIG. 5 the headstock 17 is hydrostatically mounted upon the guide rails 35 and 36 of the housing 19 of the components 11, 12. For this purpose there are provided in the headstock 17 at the upper and lower sides of the guide rails 35 and 36 a respective upper bearing pocket 83 and a lower bearing pocket 84. Additionally, the headstock 17 is provided at the right-hand side located guide rail 36 with a third lateral bearing pocket 85. Opposite this bearing pocket 85 a plastic lining 86 or the like is provided between the guide rail 36 and the headstock 17 which serves as a sliding element and at the same time as a vibration dampener. As best seen by referring to FIG. 5, the lower bearing pockets 84 and the lateral bearing pocket 85 are continuously connected via the conduit or line 87 with the pressure line 48, and the upper bearing pockets 83 are connected via conduit 88 and via a servo valve or control slide valve 89 with the pressure line or conduit 48. Depending upon the position of the control slide valve 89 both of the bearing pockets 83 are connected with the pressure line 48 or with the discharge line 90. As long as the bearing pockets are flow connected with the discharge line 90 the headstock 17 cannot be displaced upon the guide rails 35 and 36.

Figure 6:
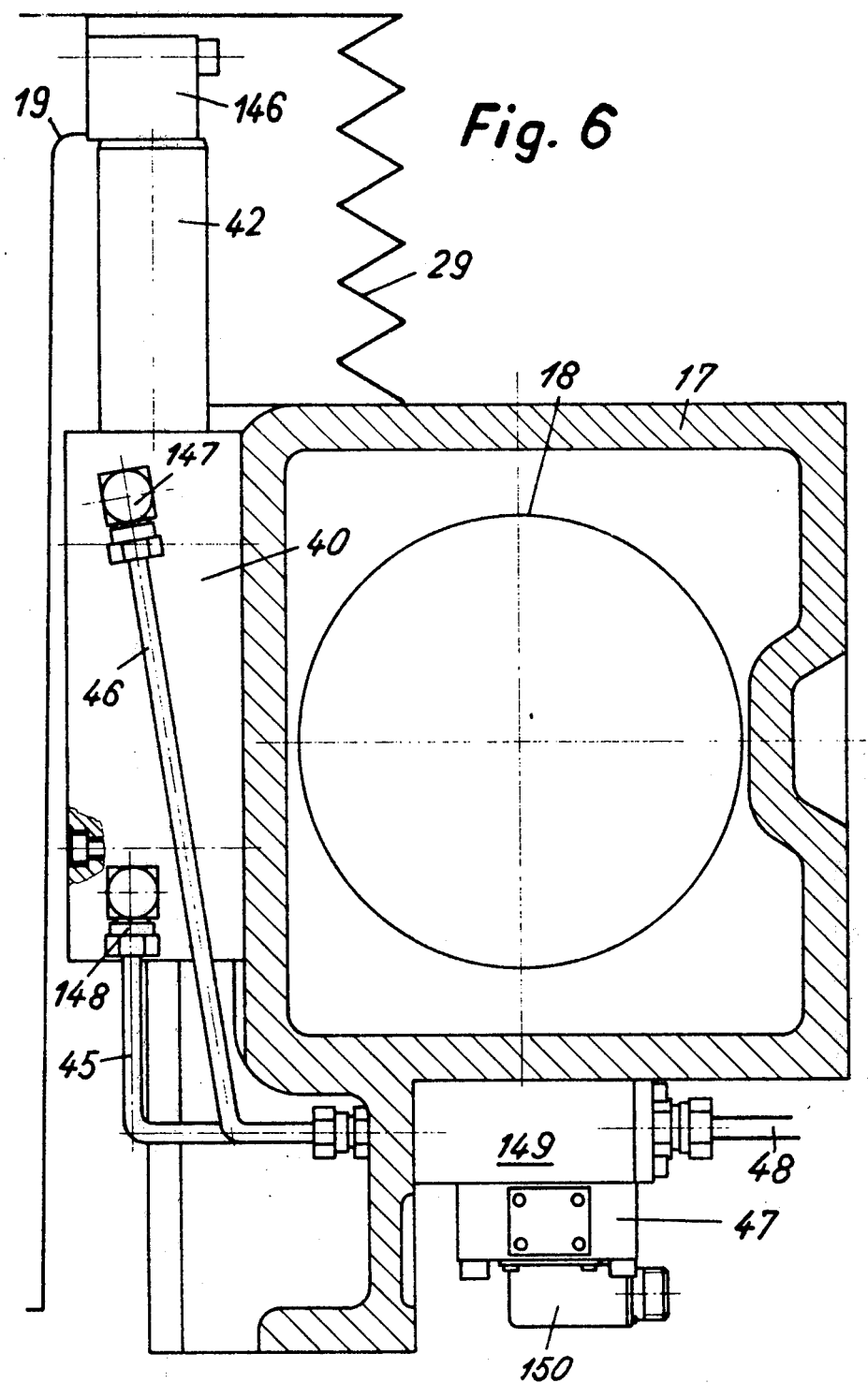
FIG. 6 is a cross-sectional view taken along the line VI—VI of FIG. 3.

From the showing of FIG. 6 there will be apparent the attachment of the cylinder 40 at the headstock 17 in which there is mounted the spindle 18. Protruding out of the cylinder 40 is the piston rod 42 connected with the piston 41 (FIG. 4). This piston rod 42 is secured via an attachment or securing member 146 at the housing 19. At the cylinder 40 there are secured in an easily disconnectable manner by means of the pipe or conduit connections 147 and 148 both of the conduits 45 and 46. These conduits 45 and 46 --as already mentioned-- flow connect both of the chambers 43 and 44 (FIG. 4) with the control slide valve or servo valve 47. This control slide valve 47 is secured to a block 149 which in turn is attached to the headstock 17. In this block 149 there opens, apart from both of the conduits or lines 45 and 46, also the conduit 48 (cf.FIGS. 4 and 6). In a housing 150, which is attached to the control slide valve 47, there are arranged the electrical elements for actuating the control slide valve 47.

Figure 7:
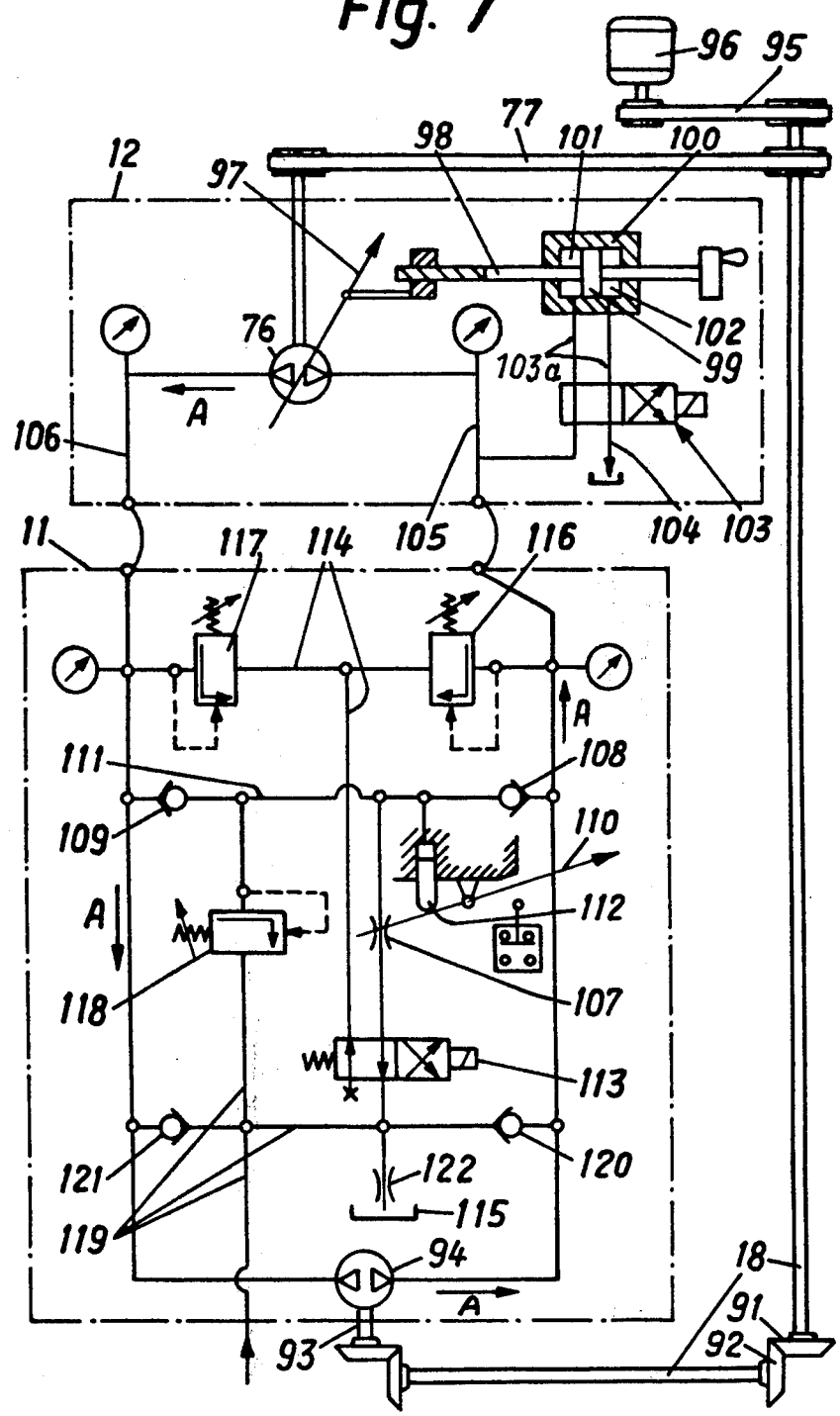
FIG. 7 is a schematic view of the hydraulic system of the machine illustrated in FIGS. 1 to 6.

According to the showing of FIG. 7 there is secured to the spindle 18 of the component 12 --which here is only schematically indicated by the chain-dot lines-- a pinion 91 which meshes with a spur bevel gear 92 which is attached to the spindle 18 of the component 11. The spindle 18 of the component 12 is connected via the gear drive 77 with the hydraulic motor 76, and the spindle 18 of the component 11 is connected via a similar gear drive 93 or equivalent structure with a hydraulic motor 94. Further, the pinion 91 is connected via a third gear drive or transmission 95 with an electric motor 96.

The hydraulic motor 76 of the ocmponent 12 is constructed such that it also can function as a pump, whereby the conveyed quantity of liquid per revolution is adjustable. In order to adjust the quantity of liquid which is to be conveyed a lever 97 is arranged at the motor 76. This lever 97 is connected through the agency of a piston rod 98 with a piston 99 which is located in a cylinder 100. This cylinder 100 is subdivided by means of the piston or piston member 99 into two chambers or compartments 101 and 102. Both of the chambers 101 and 102 are connected via the lines or conduits 103a with an electrically actuatable control valve or servo control valve 103. Depending upon the position of the control valve 103 either the chamber 101 or the chamber 102 is connected with a discharge or drain line 104 and at the same time in each instance the other chamber 102 or 101, respectively, is connected with a pressure line or conduit 105. Depending upon whether the chamber 101 or the chamber 102 is flow connected with the pressure line the piston 99 is located completely towards the left or completely towards the right of the showing of FIG. 7, and accordingly the motor functioning as a pump delivers a large or small quantity of liquid.

Both of the hydraulic motors 76 and 94 are coordinated to one another in such a manner that the small conveyed quantity of liquid of the motor 76 is smaller than the conveyed quantity of liquid of the motor 94 and the large conveyed quantity of liquid of the motor 76 is greater than the conveyed quantity of liquid of the motor 94.

By means of the conduits or lines 105 and 106 both of the hydraulic motors 76 and 94 are operatively connected with one another. The direction of flow is indicated by the arrow A and is only dependent upon the direction of rotation of the electric motor 96. In the event that the discharge or delivery capacity of the motor 76 is greater than that of the motor 94, then there prevails in the conduit 106 a larger pressure than in the conduit 105 and the motor operates as a pump. On the other hand, if the delivery capacity of the motor 76 is smaller than that of the motor 94, then there prevails in the conduit or line 105 a larger pressure than in the conduit or line 106 and the motor 94 operates as a pump. In order that it can function as a pump 94 it must be driven by the electric motor 96 through the agency of the pinion 91 and the spur bevel gear 92. If the motor 94 operates as a motor then it drives the pinion 91 via the spur bevel gear 92.

In this way it is possible to lappboth flanks of the teeth of the pinion 91 and the spur bevel gear 92 without reversing the direction of rotation of the electric motor 96. In order to adjust the lapping pressure manually there is provided a throttle or throttle member 107 which is located in a discharge or outflow line 111. This throttle 107 is connected via a check valve 108 or equivalent structure with the pressure line 105 and via a second check valve 109 or equivalent structure with the conduit or line 106. The throttle 107 can be adjusted with the aid of a manually operated or hand lever 110. The less the amount of liquid which can flow through the throttle 107 the greater the lapping pressure. In order that the operator can sense the magnitude of the lapping pressure, a piston or piston member 112 (FIG. 7) is provided which bears at one end against the hand lever 110 and at the other end is impinged by the pressure in the discharge or outflow line 111. The arrangement is undertaken such that upon constricting the throttle 107 by means of the hand lever 110 the pressure in the discharge line 111 increases and the piston 112 is more markedly loaded, with the result that there is increased the resistance against a further constriction of the throttle or throttle member 107.

In order to be able to also automatically adjust the lapping pressure, instead of simply manually, there is provided an electrically actuatable control valve or servo valve 113 which is connected both with the discharge line 111 as well as also with a further discharge or drain line 114. Depending upon the position of the control valve 113 either the discharge line 114 is closed and the discharge line 111 is open in the direction of a conduit or line 119, or the discharge line 111 is closed and the discharged line 114 is open in the direction of the conduit 119.

The discharge line 114 is connected on the one hand via a first pressure limiting valve 116 (FIG. 7) with the pressure line 105 and on the other hand via a second pressure limiting valve 117 with the conduit or line 106. Both of these pressure limiting valves 116 and 117 can be adjusted to the desired pressure. If the control valve 113 is adjusted such that the discharge line 114 is open in the direction of the conduit or line 119, then liquid flows either out of the line 105 or the line 106 via the pressure limiting valves 116 or 117, respectively, into the discharge line 114 as soon as in one of the lines or conduits 105 or 106 the pressure is greater than the permissibly adjusted pressure in the pressure limiting valves 116 and 117.

In order to prevent that there can be adjusted or set an impermissibly great lapping pressure either manually by means of the hand lever 110 or automatically by means of the adjustable pressure limiting valves 116 and 117, there is further connected a safety valve 118 (FIG. 7) at the discharge conduit or line 111. As soon as too great a pressure prevails in one of the lines 105 or 106, then via the check valve 108 or the check valve 109 and the safety valve 118 fluid can flow into the conduit or line 119. This conduit 119 is connected on the one hand via the throttle or throttle member 122 with the vat or trough 115 and also on the other hand via the check valves 120 and 121 with the conduits or lines 105 or 106. Due to the arrangement of a liquid supply ther always prevails in the conduit or line 119 the system pressure, so that always a certain portion of the liquid arriving from the control valve 113 can flow via the throttle 122 into the trough 115 or equivalent structure. This liquid portion is replace by fresh liquid via the supply line of conduit 119. Due to this liquid exchange action it is possible to remove the heat which is developed during braking.

For the automatic lapping there is mounted upon both of the work spindles 18 of the devices 11 and 12 a respective one of both of the gears to be lapped, i.e. a pinion and a spur gear. Manually, that is to say by actuating the hand wheels 20, 21 and 22, the carriage 16 is shifted in the H-direction, the headstock 17 of the device 11 in the V-direction and the headstock 17 of the device 12 in the J-direction to such an extent until both of the gears properly mesh with one another. Thereafter, the electric motor 96 is turned-on, and both of the gears rotate about their axes. With the aid of the manual lever 110 there is now adjusted the desired lapping pressure, i.e. the pressure which the flanks of the teeth of the one gear must exert on the flanks of the teeth of the other gear. As described, this lapping pressure also can be automatically set.

The lapping movement, i.e. the continuous forward-and-return movement in the directions H, V and J now occurs automatically in that, for instance, both of the work spindles 18 of both units continuously move forwards and backwards in the direction H and J. At the same time the headstock 17 of the device 11 is continuously raised and lowered in the direction V. These three movements must be accommodated to one another both as a function of time and as well as in their magnitude. The manner in which this is accomplished has been described in full detail in U.S. Pat. No. 3,724,042.

Figure 9:
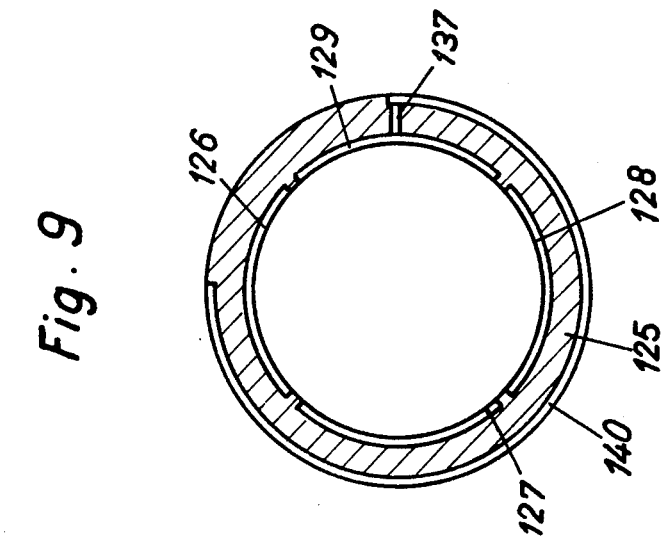
FIG. 9 is a cross-sectional view taken along the line IX—IX of FIG. 8.
Figure 8:
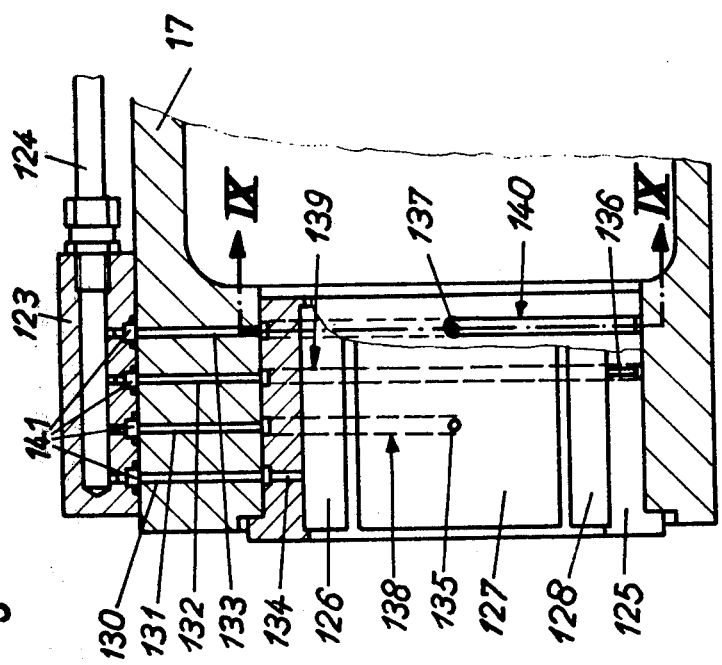
FIG. 8 is a cross-sectional view through a first exemplary embodiment of a hydrostatic bearing of a work spindle of the machine illustrated in FIG. 1.

According to the showing of FIGS. 8 and 9 each of the hydrostatic bearings for both of the spindles 18 possesses a connnection stud or piece 123 which is secured in any suitable and therefore not particularly illustrated manner at the headstock 17, and such connection stud or piece 123 contains four throttles or throttle members 141. Opening into such connection stud or piece 123 is a supply line or conduit 124 which is connected to any suitable and therefore not particularly illustrated source of pressurised oil. Each hydrostatic bearing furthermore possesses a bearing sleeve 125. As best seen by referring to FIG. 9 this bearing sleeve or bushing 125 contains four bearing pockets 126, 127, 128 and 129. In FIG. 8 there are only visible the three bearing pockets 126, 127 and 128. Each of these four bearing pockets 126, 127, 128 and 129 is connected via bores and grooves with the connection stud or piece 123. The connections for these four bearing pockets 126 to 129 with the throttles 141 in the connection piece 123 --as best seen by referring to FIGS. 8 and 9-- are of different lengths. The bearing pocket 126 is directly connected via the bore 134 (FIG.8) in the bearing sleeve 125 and the bore 130 in the headstock housing 17 with the connection piece 123.

For the remaining three bearing pockets 127, 128 and 129 there is in each instance interposed a peripheral or circumferential groove 138, 139 and 140 between the bores 135, 136 and 137 of the bearing sleeve 125 and the bores 131, 132 and 133 of the headstock housing 17. These circumferential grooves 138 to 140 are of different lengths. The first circumferential groove 138 extends over one-quarter of the circumference, the second circumferential groove over one-half of the circumference and the third circumferential groove 140 extends over three-quarters of the circumference. Hence, the bearing pocket 127 is connected via the bore 135, the circumferential groove 138 and the bore 131 with the connection stud or piece 123, the bearing pocket 128 is connected via the bore 136, the circumferential groove 139 and the bore 132 with the connection piece 123, and finally the bearing pocket 129 is connected via the bore 137, the circumferential groove 140 and the bore 133 with the connection piece 123. These different length conduit connections from the connection piece 123 to the bearing pockets 126 to 129 produce the result that the dynamic stiffness or rigidity of the spindle mounting or bearing in each bearing pocket is different. Owing to such differencies there can be avoided undesired resonance phenomena.

According to FIG. 10 and 11 the different rigidity or stiffness of the individual pockets can be attained by different size cross-sections of the individual supply or infeed lines. In this illustration the grooves 138, 139 and 140 extend over the entire circumference.

While there is shown and described present preferred embodiments of the invention, it is to be distinctly understood that the invention is not limited thereto, but may be otherwise variusly embodied and practiced within the scope of the following claims. ACCORDINGLY,

What is claimed is:

1. A machine for testing bevel and hyperboloidal gears comprising:
   a machine bed;
   a carriage displacebly mounted on said machine bed;
   two headstock beds, each havinhg a rear wall and two endwalls;
   two headstocks, each headstock being displaceably mounted on one of said headstock beds, said headstocks with their headstock beds being constructed as identical components defining a first component interchangeable with a second component, the headstock bed of said first component being mounted with the rear wall thereof at the machine bed, the headstock bed of said second component being mounted with an endwall thereof at said carriage; and manually-actuable means for displacing said headstocks.

2. The machine according to claim 1, including means for adapting said machine for use as a lapping machine, said means comprising an automatic device for displacing one of said headstocks on its associated headstock bed, said automatic device including:

a cylinder secured in an easily disconnectable manner at said one headstock;
a piston arranged in said cylinder;
a piston rod connected with the piston and secured via an attachment member in an easily disconnectable manner at said associated headstock bed;
a control valve secured to a block which in turn is attached in an easily disconnectable manner at said one headstock;
fluid conduit connections and fluid conduits connecting said control valve with said cylinder in an easily disconnectable manner.

* * * * *